Patented Nov. 6, 1951

2,574,047

UNITED STATES PATENT OFFICE 2,574,047

PHOSPHATE GLASS

Franklin H. Mackenzie, Lansdowne, Pa.

No Drawing. Application May 2, 1950,
Serial No. 159,649

3 Claims. (Cl. 252—109)

The present invention relates to a novel compound possessing advantageous properties including marked water-softening and wetting power; and more particularly the invention relates to a novel alkali metal phosphate possessing water-softening and wetting powers markedly greater than other known alkali metal phosphates.

Various alkali metal phosphates, especially sodium phosphates, are available for use as water-softeners. Two commercial products are, for example, sodium tetra phosphate ($Na_6P_4O_{13}$) and sodium hexametaphosphate ($Na_6P_6O_{18}$), which contain 61% and 69% of $P_2O_5$, respectively, the remainder being $Na_2O$. It is known that these materials possess valuable water-softening powers by virtue of their ability to sequester alkaline earth metal salts, particularly calcium and magnesium salts, in water. Because of this sequestering ability, sodium phosphates of the type mentioned have been widely used for the treatment of hard water for cleaning and boiler water purposes. In addition, these sodium phosphates have wetting power to a certain extent. This property, in conjunction with their sequestering power, make these compounds especially useful for the treatment of water, especially hard water, for laundering purposes, textile finishing, and the like.

It is the principal object of the present invention to provide a novel alkali metal phosphate possessing sequestering powers markedly greater than those of the known alkali metal phosphates.

A further object is to provide a novel alkali metal phosphate possessing wetting powers markedly greater than those of the known alkali metal phosphates.

Further objects including the provision of a valuable laundering material comprising soap and the described product will be apparent from a consideration of the following specification and the claims.

The product of the present invention comprises a sodium phosphate, containing between approximately 65 and approximately 67% $P_2O_5$, the remainder being sodium oxide.

The described compound is a clear, transparent, glassy, amorphous solid which is very soluble in water. When dissolved in water it provides a pH within the neutral range, that is between about 6 and about 8. As will be pointed out more in detail hereinafter, the product possesses a calcium sequestering value much greater, and wetting power six or more times greater than those of the alkali metal phosphates presently commercially available. Because of these improved calcium sequestering and wetting properties, the product of the invention is advantageously employed in fields where one or both of these properties can be utilized, such as in the treatment of boiler feed water, laundering, and the like. The product of the invention may be used as such or in combination with other agents used in the particular field. For instance, a particularly valuable laundering product can be prepared by incorporating from about 10% to about 50% of the product of the invention in ordinary water-soluble soap. This combination insures softness of water for washing and rinsing purposes and results in markedly improved wetting power.

In preparing the novel product, any of the known methods for preparing alkali metal phosphate glass may be followed, with the exception, of course, that the proportion of reactants be adjusted to provide the $P_2O_5$ content within the above-stated range. Generally, the preparation of the sodium phosphate glass involves a reaction between a simple, basic, inorganic sodium-containing compound and a simple acidic phosphate. The basic inorganic sodium-containing compound will be one which provides a volatile anion such as the hydroxide, carbonate, and the like. The acidic phosphate will be one which provides a volatile cation, such as ammonium mono- or di-hydrogen phosphate, phosphoric acid, and the like. One or more of the reactants may be a sodium phosphate whose $P_2O_5$ content is outside the stated range, sufficient sodium compound or phosphate, as the case may be, being supplied to provide the stated range of $P_2O_5$. For example, with a sodium phosphate having a $P_2O_5$ content below the stated range, sufficient of the stated phosphate may be added to raise the $P_2O_5$ content to the stated range; or, with a sodium phosphate having a $P_2O_5$ content above the stated range, sufficient sodium compound may be added to lower the proportion of $P_2O_5$ to the stated range. The preferred reactants are phosphoric acid and a sodium carbonate. The reactants need not be pure, the commercial grades having been found to be satisfactory.

As will be clear from the above, the selection of the proportions of reactants will offer no problem. Although the exact proportions of reactants will depend upon the particular reactants selected, the proportions in any case will be selected to provide in the reactant mixture, a $P_2O_5$ content of between approximately 65 and approximately 67% based on the combined weight of the sodium oxide and $P_2O_5$ present. This, of course, will provide a final sodium phosphate product containing between approximately 65 and approximately 67% $P_2O_5$, the remainder being the sodium oxide.

The reaction is advantageously initially carried out in aqueous medium. The amount of water may vary widely and may be just that supplied by the phosphoric acid solution. For example, a particularly advantageous method of forming the reaction medium is merely to mix the sodium compound, such as the carbonate, and a commercial phosphoric acid solution, such as the 75%, by weight, furnace phosphoric acid of commerce.

Heat is relied upon to insure complete reaction. Where reactants providing volatile components, such as a sodium carbonate, are employed, the heat also drives off these extraneous components, carbon dioxide in the case of the above-mentioned sodium carbonate. Generally, the reaction mixture is heated to a temperature between about 80° C. and its boiling point, advantageously at least 105° C. Preferably, the reaction mixture is maintained near its boiling point. The length of time during which heat is applied to the aqueous mixture will vary depending upon the temperature used, but, in any event, the time-temperature conditions are selected to bring about the reaction as well known to those familiar with the art. As an indication of when the reaction is complete when a sodium carbonate and phosphoric acid solution are employed as the reactants, the aqueous mixture is heated until a clear, transparent liquor is obtained. Water may be added from time to time to replace that lost by evaporation, or the reaction may be carried out under reflux conditions. Agitation is advantageously provided to facilitate the reaction.

After the reaction is complete, the aqueous mixture is further heated to remove the remaining water and to melt the product, after which, the molten material is rapidly chilled in accordance with well known practice. The solution containing the reaction product may be merely further heated in the reaction vessel until all or a major portion of the water has been removed, after which the material may be removed to a furnace or other suitable device, where it can be melted. Or the solution containing the reaction product may be first removed from the reaction vessel to a furnace where drying and melting take place. For example, the solution containing the reaction product may be further heated in the reaction vessel until the mass is converted to a wet mush. The wet mush may then be transferred to a furnace where the remaining water is removed and melting takes place. Separate vessels for drying and for melting may be employed, if desired. Preferred practice is to remove the solution containing the reaction product to a furnace where all the water is removed and the product melted in one operation.

The resulting clear, transparent molten mass is then rapidly chilled. This may be accomplished by a variety of means well known to those familiar with the art. For example, the molten mass may be poured onto cold surface, such as into water-cooled pans or trays. This rapid chilling to below the freezing point causes the solidified material to fracture into relatively small pieces. This fractured mass is easily handled, and may be transferred to air-tight containers where it can cool to ordinary temperatures without picking up moisture. Preferred practice merely involves placing the hot fractured material into air-tight steel drums or other containers where it is permitted to cool to ordinary temperatures.

The fractured material, which is clear, transparent, glassy solid, soluble in water, can be subsequently treated as desired by conventional means. For example, the material may be ground to a finer size, screened, and packaged following well known procedures. The handling of the material from the time it has solidified from the molten state, is preferably done in a dehumidified atmosphere.

The preparation of the novel product of the present invention and its valuable properties may be more easily understood from a consideration of the following example which is given solely for the purpose of illustration and is not intended to limit the scope of the invention in any way.

*Example*

In a stainless steel vessel, sodium carbonate (soda ash) having an $Na_2O$ content of 58% is mixed with 75% (by weight) commercial furnace phosphoric acid having a $P_2O_5$ content of about 54%. The proportions of sodium carbonate and of phosphoric acid are such as to provide a $P_2O_5$ content of approximately 66% (based on the combined weight of the $P_2O_5$ and $Na_2O$ present). The mixture is boiled until a clear, transparent, solution is obtained. Water is added from time to time during the boiling to replace the water evaporated. This mixture is well agitated with a mechanical stirrer during the boiling.

The resulting clear solution is transferred to a furnace in a platinum coated ceramic crucible where it is heated until all the water is removed and a clear, transparent melt is obtained.

The molten material is then poured into water-cooled platinum coated steel pans where it is rapidly chilled to below its freezing point. As soon as the fracturing resulting from the rapid chilling has taken place, the material is transferred to air-tight steel drums where it is allowed to cool to room temperature. The resulting cooled material is then ground, screened, and packaged in a dehumidified atmosphere.

The product was tested for calcium sequestering power and compared with two commercial sodium phosphates containing 61% $P_2O_5$ and 69% $P_2O_5$, respectively, as follows:

Four grams of the particular phosphate are dissolved in distilled water to make a liter of solution. To 100 ccs. of this solution, diluted with an equal volume of distilled water and heated to 120° F., are added 2 cc. of a standard soap solution (1 cc. is equivalent to 1 mg. $CaCO_3$, Standard Methods of Examination of Water and Sewage, 9th Addition, American Public Health Association). The resulting solution is titrated with a hardness solution prepared by dissolving 10.3 grams of $CaCl_2$ in distilled water to make a liter of solution (equivalent to 9.37 grams of $CaCO_3$ per liter). The calcium chloride solution is added in small amounts until an end point is reached at which the foam, produced by vigorously shaking the sample after each addition of calcium chloride solution, no longer persists for 5 minutes. The number of ccs. of calcium chloride solution added before this point is reached is the calcium sequestering value, and the values for the various sample tested are as follows:

| Sample | Calcium Sequestering Power |
|---|---|
| Sodium tetra phosphate (61% $P_2O_5$) | 7 |
| Product of example (66% $P_2O_5$) | 12 |
| Sodium hexametaphosphate (69% $P_2O_5$) | 4 |

Products of the present invention prepared to have $P_2O_5$ contents ranging from approximately 65% to approximately 67%, have been found to have calcium sequestering values ranging from 11 to 13 when determined in the same manner.

The products of the example was also tested for wetting power and compared with sodium tetra phosphate and sodium hexametaphosphate, by the Draves test by determining the time (termed the wetting speed) in seconds required for a weighted cotton skein to sink in an aqueous solution containing 0.2% of the particular phosphate and 0.8% of an anhydrous, water-soluble soap. The results were as follows:

| Sample | Wetting Speed |
| --- | --- |
|  | (Seconds) |
| Sodium tetraphosphate (61% $P_2O_5$) | Over 600 |
| Product of example (66% $P_2O_5$) | 95 |
| Sodium hexametaphosphate (69% $P_2O_5$) | Over 600 |

Modification is possible in selecting the particular reactants, as well as in the particular method of producing the product without departing from the scope of the present invention.

I claim:

1. A sodium phosphate in the form of a clear, transparent, glassy, amorphous solid, containing between approximately 65% and approximately 67% of $P_2O_5$, based on the combined weight of said $P_2O_5$ and the oxide of said sodium.

2. A laundering material comprising a water-soluble soap and between about 10% and about 50%, based on the weight of the soap, of a sodium phosphate in the form of a clear, transparent, glassy, amorphous solid containing between approximately 65% and approximately 67% of $P_2O_5$, based on the combined weight of said $P_2O_5$ and the oxide of said sodium.

3. The method of making a sodium phosphate glass possessing marked sequestering and wetting properties which comprises reacting, in an aqueous medium, a sodium oxide-supplying material and a $P_2O_5$-supplying material in a proportion to provide between approximately 65% and approximately 67% of $P_2O_5$, based on the combined weight of said $P_2O_5$ and said sodium oxide; removing water from the reaction product; melting the reaction product, and cooling the molten material at a sufficiently rapid rate to cause self-fracturing of the solid product.

FRANKLIN H. MACKENZIE.

REFERENCES CITED

The following references are of record in the file of this patent:

UNITED STATES PATENTS

| Number | Name | Date |
| --- | --- | --- |
| 2,365,190 | Hatch | Dec. 19, 1944 |

OTHER REFERENCES

Article by Schwartz & Munter on pgs. 32–39 (particularly pg. 34) of Industrial & Chemical Engineering, January 1942 (vol. 34, No. 1).